H. HIGGIN.
MACHINE FOR MAKING METAL TUBES.
APPLICATION FILED AUG. 5, 1910.
1,019,043.
Patented Mar. 5, 1912.
2 SHEETS—SHEET 1.
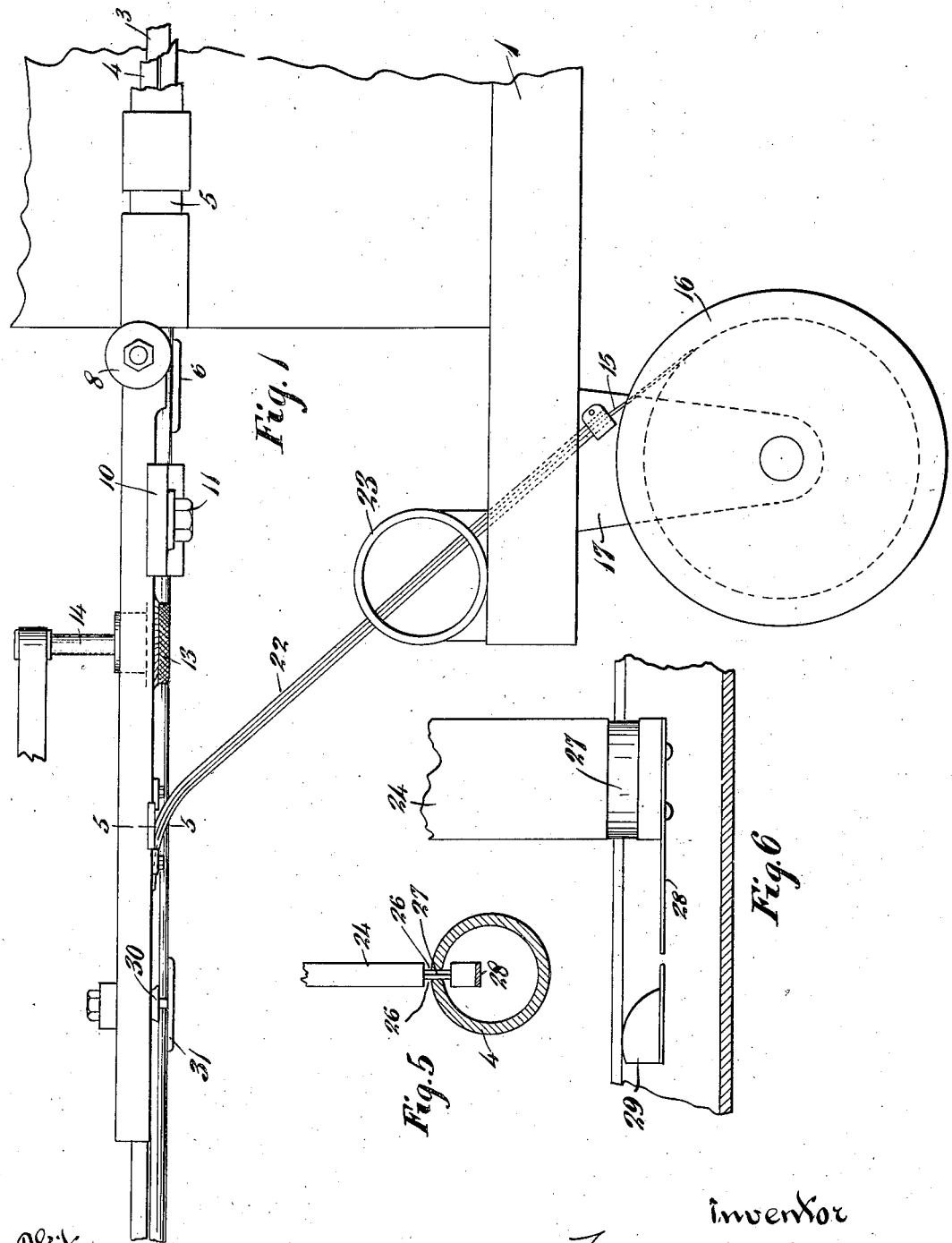

H. HIGGIN.
MACHINE FOR MAKING METAL TUBES.
APPLICATION FILED AUG. 5, 1910.
1,019,043.
Patented Mar. 5, 1912.
2 SHEETS—SHEET 2.
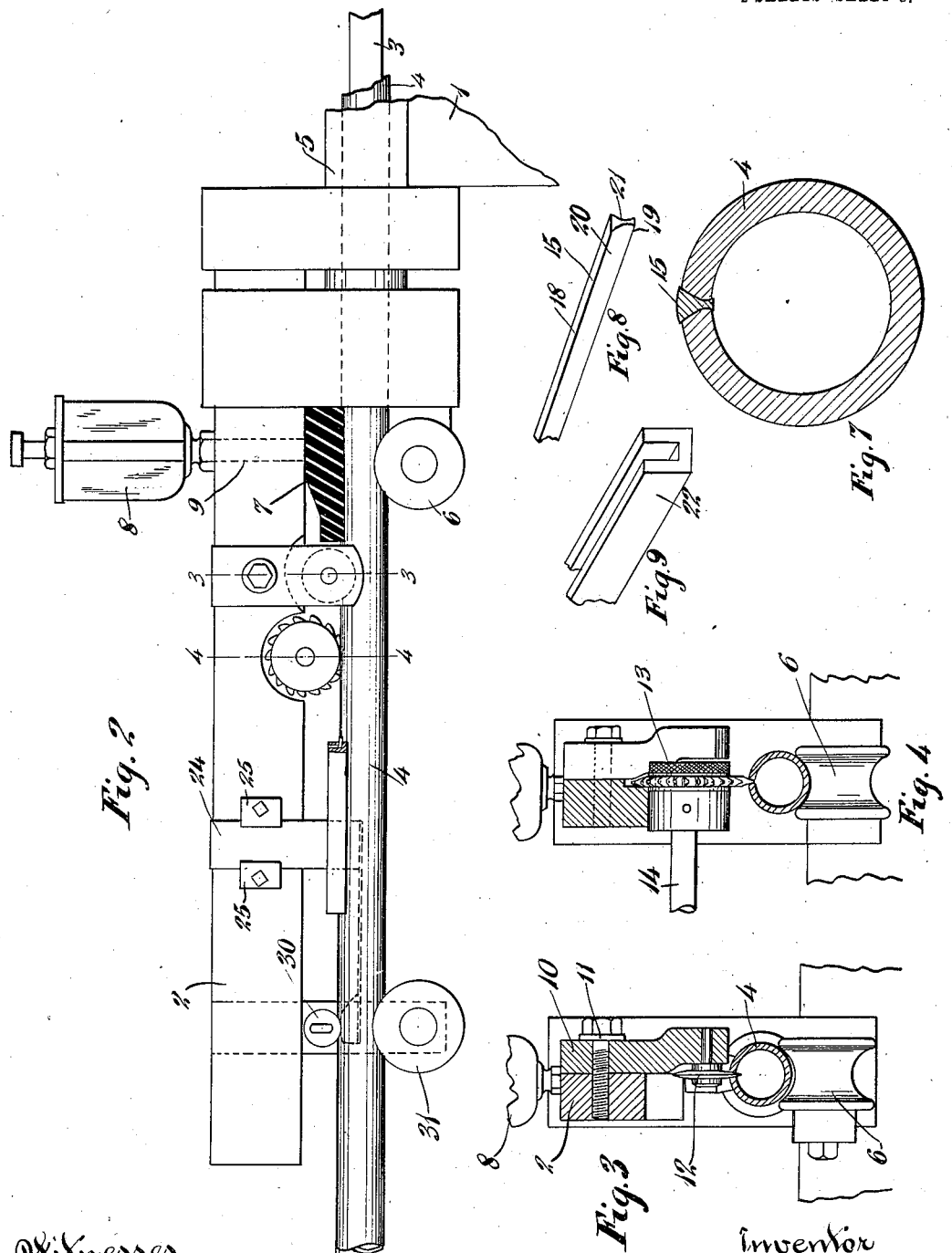

UNITED STATES PATENT OFFICE.

HENRY HIGGIN, OF NEWPORT, KENTUCKY.

MACHINE FOR MAKING METAL TUBES.

1,019,043.  Specification of Letters Patent.  Patented Mar. 5, 1912.

Application filed August 5, 1910. Serial No. 575,827.

*To all whom it may concern:*

Be it known that I, HENRY HIGGIN, a citizen of the United States, and a resident of the city of Newport, in the county of Campbell and State of Kentucky, have invented certain new and useful Improvements in Machines for Making Metal Tubes, of which the following is a full, clear, and exact description, reference being had to the accompanying drawings, forming part of this specification.

The object of my invention is to provide an attachment or additional device for tube making machines in order to prepare the tube for brazing, and my invention consists of that novel construction and arrangement of parts to be hereinafter particularly pointed out and claimed, in which mechanism is provided for cutting a longitudinal groove at the meeting edges of the tube after it is formed, which groove is adapted to receive a specially designed strip of spelter solder which is fed continuously between the meeting edges of the tube as the tube is fed from the forming devices, and by which mechanism the tube is fully prepared for the brazing machine with the proper amount of solder held in place between the meeting edges of the tube so that when submitted to the brazing furnace, the seam can be perfectly and securely brazed without waste of solder and with a uniform amount of solder distributed throughout the length of the seam.

In the drawings, Figure 1 is a top plan view of the delivery end of a tube forming machine with my additional mechanism added. Fig. 2 is a side elevation of the same. Fig. 3 is a transverse section taken on the lines 3, 3, of Fig. 2. Fig. 4 is a transverse section taken on the lines 4, 4, of Fig. 2. Fig. 5 is a transverse section of the tubing and opening device taken on the lines 5, 5, of Fig. 1. Fig. 6 is a longitudinal section of the construction shown in Fig. 5. Fig. 7 is a cross section of the tubing with the spelter in place. Fig. 8 is a perspective view of a portion of the spelter. Fig. 9 is a perspective view of one end of the guiding trough for the spelter.

1 is the framework of the tube forming machine provided with a horizontal extension framework 2 for holding the additional devices.

3 is the mandrel upon which the tubing 4 is formed in the machine, and this tubing, at the delivery end, passes through a hollow cylindrical arbor 5 at the end of the main framework. The tube passes from the tube forming devices over a grooved roller 6, suitably journaled and supported in the end of the frame, and resting upon the tube immediately above this roller is a packing of felt or other suitable material 7, secured in the frame.

8 is a suitable vessel for containing turpentine or other cleansing liquid which is fed down through the tube 9 upon the felt to keep the same saturated to thoroughly cleanse the upper portion of the tube around the meeting edges which are to be subsequently brazed. Immediately beyond this cleansing pad is a depending plate 10 secured by bolt 11 to the extension frame 2, and this plate 10 carries journaled in its lower end a disk 12, the edge of which comes in between the side edges of the tube to slightly open the tube. Immediately beyond this opening disk is located the cutting wheel 13 mounted on the shaft 14, rotated in any suitable way, and this cutting wheel is so located as to cut the bevel off the edges of the tube in a somewhat V-shape.

The tube is now ready for the reception of the spelter. This spelter is a hard solder of proper composition for brazing, and the spelter is formed in a continuous strip 15 mounted on a reel 16, which is journaled horizontally in an arm 17, projecting from the main framework. The spelter is formed somewhat of a truncated triangular shape in cross section, with a comparatively broad base 18 and a narrow base 19 with sides slightly curved lengthwise, as shown at 20 and 21 in Fig. 8. The spelter is fed and guided in the U-shaped trough 22 which passes through the bottom of a vessel 23. This vessel 23 is filled with any suitable flux, and the trough passes through the bottom of the vessel so that the spelter wire which is guided in the trough 22 receives in its passage sufficient flux for the brazing.

The outer end of the trough delivers the continuous strip of spelter immediately to the rear of the plate 24 which is bolted by the clip plates 25, 25, to the frame 2. The depending end of this plate 24 is provided with a transverse groove 26 on each side to reduce the thickness of the plate as shown at 27 in Fig. 5, and the edges of the tube 4 are spread apart by this portion 27 of the plate. To the bottom of the plate 24 is secured a spring strip 28 which carries on its outer end a block 29 which operates in conjunction with the grooved roller 30, one inside and the other outside of the tube, to hold the spelter securely in place between the edges of the tube as indicated in Fig. 7. A grooved roller 31 mounted in the frame supports the tube as it is fed from the machine. The tube is now ready for the brazing furnace, and the exact amount of solder needed for the brazing has been distributed uniformly between the meeting edges of the tube.

In operation, the devices work automatically to supply the proper amount of solder uniformly for the brazing process. The tube upon being formed is first thoroughly cleansed by passing under the cleansing pad 7, then the edges of the tube are opened by the disk 12 and the milling cutter 13 cuts the edges so that they will properly hold the spelter. The spelter having been previously formed in the continuous strip, is supplied to the reel 16 and fed continuously between the meeting edges of the tube, the tube being held open by the portion 27 of the plate 24. To properly center and adjust the spelter in place, the supporting block 29 and the pressure roller 30 are provided. The movement of the tube as it passes from the tube forming machine is the means employed for feeding the spelter wire. It will be evident that when the wire has been inserted between the meeting edges of the tube as described, the forward movement of the tube forming machine will draw the wire with it, so that no additional means for feeding the spelter is required.

Having thus described my invention, what I claim as new and desire to secure by Letters Patent, is:

1. In a machine for making metal tubes, the combination with means for continuously delivering the tubes bent into cylindrical shape and having their edges abutting, of means for continuously beveling said abutting edges, with means for spreading said abutting edges, and means for delivering a continuous strip of spelter wire between said abutting edges.

2. In a machine for making metal tubes, means for delivering a continuous strip of spelter wire between the abutting edges of the tube, and means for cutting a V-shaped groove at the meeting edges of the tube to hold the spelter in place with means for spreading said abutting edges and holding the same apart both in front and to the rear of the cutting means.

3. In a machine for making tubes, a reel adapted to hold a roll of spelter wire, a guiding channel extending from the reel to a point in line with the tube as delivered from the forming rolls, and a spreader for temporarily opening the abutting edges to receive the spelter.

4. In a machine for making tubes, a reel adapted to hold a roll of spelter wire, a guiding channel extending from the reel to a point in line with the tube as delivered from the forming rolls, and a spreader for temporarily opening the abutting edges to receive the spelter, and a grooved roller and block to center the spelter between the edges.

5. In a machine for making tubes, a reel adapted to hold a roll of spelter wire, a guiding channel extending from the reel to a point in line with the tube as delivered from the forming rolls, a receptacle for flux through which the guiding channel passes, and a spreader for temporarily opening the abutting edges to receive the spelter.

6. In a machine for making tubes, a reel adapted to hold a roll of spelter wire, a guiding channel extending from the reel to a point in line with the tube as delivered from the forming rolls, a receptacle for flux through which the guiding channel passes, a cleansing pad pressing upon the seamed portion of the tube, a spreader to open the tube and a cutter to bevel off the abutting edges with a spreader to hold the edges apart beyond the cutter, and a grooved roller and block to center the spelter in position.

HENRY HIGGIN.

Attest:
FRANK H. KUNKEL,
K. SMITH.